UNITED STATES PATENT OFFICE.

ALBERT E. GESSLER, OF NEW YORK, N. Y.

MANUFACTURE OF COLOR-LAKES.

1,157,525.   Specification of Letters Patent.   Patented Oct. 19, 1915.

No Drawing.   Application filed February 9, 1912. Serial No. 676,487.

*To all whom it may concern:*

Be it known that I, ALBERT EDWARD GESSLER, a subject of the German Emperor, and a resident of New York, Clifton, borough of Richmond, in the county of Richmond and State of New York, have invented new and useful Improvements in the Manufacture of Color-Lakes, of which the following is a full, clear, and exact description.

My invention consists in the production of new coloring matter lakes, valuable in consequence of their insolubility in water and oil which makes them well adapted to the manufacture of printing inks, paints and pigment colors for all purposes.

My invention relates in general to the manufacture of azo coloring matter lakes, by the combination of either 2-naphthol-7-sulfonic acid, or 2-naphthol-6-sulfonic acid with a diazotized amino base particularly dianisidin, tolidin, benzidin, beta-naphthylamin, or chloranisidin, from which results a dyestuff insoluble in water, which may be expressed by the following formula:

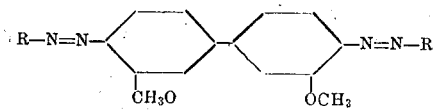

Where R is the radical of naphthol mono-sulfonate, the R in the formula may be expressed as follows:

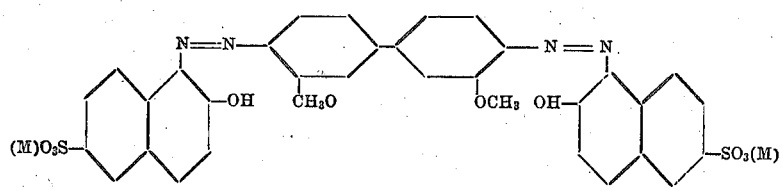

where M in the formula represents metal.

These dyestuffs are in the form of their alkali salts already characterized by their little solubility in water, in the form of their lakes or salts as those with aluminum, barium, calcium, lead or copper (or the like) they are practically insoluble in water. They are insoluble in oil, benzole or varnish and do not sublime, and possess a deep blue color. The new disazo dyes are further characterized by their reaction with concentrated sulfuric acid, in which they are soluble, tinting the solution a brilliant greenish blue color. This dye stuff, on suitable treatment with reducing agents, will yield dianisidin and amino-2-naphthol-sulfonic acid 6.

To illustrate the manner in which my invention may best be carried out, the following formula may be given for an example.

Example: Dissolve about 9.5 parts of dianisidin in a solution of twenty (20) parts of hydrochloric acid of about 20° Bé. strength in three hundred (300) parts of hot water. Cool down with ice to about 0° centigrade and slowly introduce therein a solution of seven (7) parts of sodium nitrite dissolved in about two hundred (200) parts of water 0° centigrade. Stir for about twenty minutes, filter it and add thirty (30) water to one thousand (1000) parts. Keep parts of sodium acetate, then fill up with the temperature at about 0° centigrade, then run this liquid into a solution of about twenty (20) parts of the sodium salt of 2:6-naphthol-sulfonic acid in about fifteen hundred (1500) parts of water containing ten (10) parts of sodium carbonate and five (5) parts of Turkey red oil. Stir well, then treat with water-soluble salts of the metal whose lake is to be produced. For instance, by adding a solution of thirty (30) parts of copper sulfate while well stirring. Wash, filter, press and dry.

In using 2-naphthol-7-sulfonic acid, the same quantity is used as with 2-naphthol-6-sulfonic acid.

It may be stated that the treatment with metallic salts may be done either before or after combining the two constituents and either before or after washing.

If desired, the above combinations may be made in the presence of a substratum as used in the manufacture of lakes, for instance, barium sulfate, whiting, aluminum hydroxid or the like.

It is important to state that the copper lakes of these dyestuffs are distinguished from the other salts by their excellent fastness to light.

Having thus described my invention, I claim as new and desire to secure by Letters Patent:

1. As a new article of manufacture, lakes containing a disazo dye stuff having probably the formula

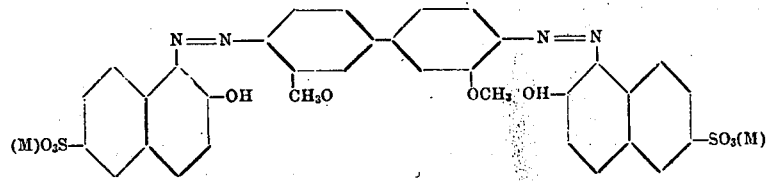

where M represents a metal obtained by combining tetrazotized dianisidin and 2:6-naphthol-sulfonic acid.

2. As a new article of manufacture, lakes containing a disazo dye stuff having probably the formula

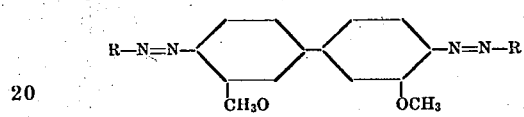

obtained by combining tetrazotized dianisidin, naphthol-mono-sulfonate, where R is the radical of naphthol-mono-sulfonate.

3. As a new article of manufacture, lakes containing disazo dye stuff derived from a combination of 2:6-naphthol-sulfonic acid, tetrazotized dianisidin and a copper compound, the so formed dye stuff being characterized by its non-solubility in water, oil, benzole and varnish; it does not sublime, and when reacted upon with concentrated sulfuric acid forms a greenish blue colored solution, and when acted upon with a reducing agent it yields a diamino base and 1-amino-2-naphthol-sulfonic acid 6.

In testimony whereof I have signed my name to this specification in the presence of two subscribing witnesses.

ALBERT E. GESSLER.

Witnesses:
HERMANN SCHOEFFLER,
ERNST GOMMET.